United States Patent
Cai

(10) Patent No.: US 9,363,109 B2
(45) Date of Patent: Jun. 7, 2016

(54) ANTI-SAMPLING OFFSET PROCESSING METHOD AND METHOD FOR CHANNEL ESTIMATION IN WIRELESS COMMUNICATION SYSTEM

(71) Applicant: ZTE Microelectronics Technology Co., Ltd, Shenzhen (CN)

(72) Inventor: Zaiming Cai, Shenzhen (CN)

(73) Assignees: ZTE Corporation, Shenzhen, Guangdong (CN); ZTE Microelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/649,319

(22) PCT Filed: Oct. 24, 2013

(86) PCT No.: PCT/CN2013/085899
§ 371 (c)(1),
(2) Date: Jul. 23, 2015

(87) PCT Pub. No.: WO2014/086212
PCT Pub. Date: Jun. 12, 2014

(65) Prior Publication Data
US 2015/0319012 A1 Nov. 5, 2015

(30) Foreign Application Priority Data
Dec. 4, 2012 (CN) .......................... 2012 1 0510510

(51) Int. Cl.
*H04B 15/00* (2006.01)
*H04L 25/02* (2006.01)
*H04L 12/26* (2006.01)

(52) U.S. Cl.
CPC ............ *H04L 25/0204* (2013.01); *H04L 25/02* (2013.01); *H04L 25/024* (2013.01); *H04L 43/0876* (2013.01)

(58) Field of Classification Search
CPC ... H04L 25/02; H04L 25/0204; H04L 25/024; H04L 43/0876
See application file for complete search history.

(56) References Cited

U.S. PATENT DOCUMENTS 6,097,770 A * 8/2000 Bahai ................... H04L 25/0242
375/343

(Continued)

FOREIGN PATENT DOCUMENTS

| CN | 101645861 A | 2/2010 | |
|---|---|---|---|
| CN | 101808054 A | 8/2010 | |
| CN | WO 2011137751 A1 * | 11/2011 | ............... H04L 25/02 |

OTHER PUBLICATIONS

International Search Report in international application No. PCT/CN2013/085899, mailed on Jan. 30, 2014.
(Continued)

*Primary Examiner* — Syed Haider
(74) *Attorney, Agent, or Firm* — Oppedahl Patent Law Firm LLC

(57) ABSTRACT

Provided are an anti-sampling offset processing method and apparatus for channel estimation in a wireless communication system, and the method includes: a main path threshold and a first side lobe threshold are acquired based on a result of IFFT during the channel estimation, wherein the first side lobe threshold is smaller than the main path threshold; a noise reduction threshold and a second side lobe threshold are acquired based on a measurement result of Interference on Signal Code Power (ISCP), wherein the second side lobe threshold is smaller than the noise reduction threshold; a predetermined number of strongest paths are selected from main paths determined according to the main path threshold and the noise reduction threshold and a predetermined number of paths adjacent to the strongest paths are labelled as side lobes; and the paths labelled as side lobes are selected according to a final threshold and paths equal to or larger than the final threshold are reserved for participation of subsequent demodulation, wherein the final threshold is the greater one of the first side lobe threshold and the second side lobe threshold. In the present disclosure, impacts of sampling offsets in a wireless communication system on channel estimation are taken into consideration, and side lobes of a main path are introduced into a demodulation process, thereby improving reception performance of a terminal in the wireless communication system.

10 Claims, 3 Drawing Sheets

(56) References Cited

U.S. PATENT DOCUMENTS

| | | | |
|---|---|---|---|
| 2005/0073947 A1 | 4/2005 | Dey | |
| 2006/0013326 A1* | 1/2006 | Yoshida | H04L 25/022 375/260 |
| 2007/0071072 A1* | 3/2007 | Banister | H04B 1/7117 375/148 |
| 2012/0311601 A1* | 12/2012 | Sun | H04L 25/02 718/104 |
| 2014/0226587 A1* | 8/2014 | Tang | H04L 25/0206 370/329 |

OTHER PUBLICATIONS

English Translation of the Written Opinion of the International Search Authority in international application No. PCT/CN2013/085899, mailed on Jan. 30, 2014.

* cited by examiner

ANTI-SAMPLING OFFSET PROCESSING METHOD AND METHOD FOR CHANNEL ESTIMATION IN WIRELESS COMMUNICATION SYSTEM

TECHNICAL FIELD

The present disclosure relates to the technical field of communications, and in particular to an anti-sampling offset processing method and method for channel estimation in a wireless communication system.

BACKGROUND

Performance of a wireless communication system is affected by conditions of wireless channels to a great extent, such as shadow fading and frequency selective fading, and it is required to perform channel estimation so as to recover accurately transmitted signals from a transmission end. In an existing channel estimation mode, influence of sampling offsets on whole performance of a system is generally not taken into consideration during a noise reduction process in post processing of the channel estimation, signal side lobes are also removed when noises are eliminated, thus resulting in poor performance of a receiver.

Channel estimation of a Wideband Code Division Multiple Access (WCDMA) system or a Time Division-Synchronous Code Division Multiple Access (TD-SCDMA) system is taken as an example, a conventional channel estimation involves that Fast Fourier Transform (FFT) is performed firstly in frequency domain, then a time-domain channel estimation value is obtained through Inverse Fast Fourier Transform (IFFT), and noise influence is eliminated through post processing in which sampling offsets of the receiver are not taken into consideration, and signal side lobes are inevitably eliminated together with the elimination of noises, because during a noise elimination process of channel estimation, due to a relatively fast attenuation of the signal side lobes with respect to that of the main lobe and relatively small energy of the side lobes, particularly in cases where the SNR is not very high, the energy of the side lobes is overwhelmed in the noises, thus the signal side lobes are eliminated when the noises are eliminated. This processing method has its disadvantages: it firstly lacks a corresponding processing of sampling offsets, thus energy of received signals will be lowered and the reception SNR will be reduced; secondly, interferences resulted from signal side lobes are not taken into consideration, thus quality of the received signals are deteriorated and performance of the receiver is lowered.

SUMMARY

In view of the above, embodiments of the present disclosure are intended to provide an anti-sampling offset processing method and method for channel estimation in a wireless communication system, which can solve the problem in the prior art that sampling offsets are not taken into consideration in channel estimation.

To this end, the technical solutions of embodiments of the present disclosure are implemented as follows.

According to one aspect, an embodiment of the present disclosure provides an anti-sampling offset processing method for channel estimation in a wireless communication system, and the method includes: a main path threshold determination step of acquiring a main path threshold and a first side lobe threshold based on a result of Inverse Fast Fourier Transform (IFFT) during the channel estimation, wherein the first side lobe threshold is smaller than the main path threshold; a noise reduction threshold determination step of acquiring a noise reduction threshold and a second side lobe threshold based on a measurement result of Interference on Signal Code Power (ISCP), wherein the second side lobe threshold is smaller than the noise reduction threshold; a side lobe determination processing step of selecting a predetermined number of strongest paths from main paths determined according to the main path threshold and the noise reduction threshold and labeling a predetermined number of paths adjacent to the strongest paths as side lobes; and a side lobe selection processing step of selecting the paths labelled as side lobes according to a final threshold and reserving paths equal to or larger than the final threshold for participation of subsequent demodulation, wherein the final threshold is a greater one of the first side lobe threshold and the second side lobe threshold.

In an embodiment, in the main path threshold determination step, the main path threshold and the first side lobe threshold may be determined based on a following formula: $\Gamma_j^{(i)} = \lambda_{j+1}^{(i)} \max([|\hat{h}_{E1}^{(i)}|^2, |\hat{h}_{E2}^{(i)}|^2 \ldots |\hat{h}_{Ej}^{(i)}|^2])$, with $\hat{h}_{Ej}^{(i)}$ being a result of IFFT during an ith level channel estimation of a jth cell and $\lambda_j^{(i)}$ being a threshold factor, wherein $\lambda_1^{(i)} \sim \lambda_j^{(i)}$ is a main path threshold factor and a corresponding $\Gamma^{(i)}$ is the main path threshold, and $\lambda_{j+1}^{(i)}$ is a first side lobe threshold factor and a corresponding $\Gamma^{(i)}$ is the first side lobe threshold; wherein a value of the first side lobe threshold factor is smaller than a value of the main path threshold factor.

In an embodiment, in the noise reduction threshold determination step, the noise reduction threshold and the second side lobe threshold may be determined based on a following formula: $\Omega_j^{(i)} = \gamma_j^{(i)}$ with $\delta^{2(i)}$ being a noise measurement result of the ISCP during an ith level channel estimation and $\gamma_j^{(i)}$ being a threshold factor, wherein $\lambda_1^{(i)} \sim \lambda_j^{(i)}$ is a noise reduction threshold factor and a corresponding $\Omega^{(i)}$ is the noise reduction threshold, and $\lambda_{j+1}^{(i)}$ is a second side lobe threshold factor and a corresponding $\Omega^{(i)}$ is the second side lobe threshold; wherein a value of the second side lobe threshold factor is smaller than a value of the noise reduction threshold factor.

In an embodiment, in the side lobe determination processing step, the predetermined number of paths may include a same number of paths equally located on the left and the right of the strongest paths, and the same number may be any one of 0 to 5 chips.

In an embodiment, the predetermined number of the strongest paths may be any integer of 0 to 3, and the strongest paths are not labelled as side lobes.

In an embodiment, the side lobe determination processing step may be performed only in a (n-1)th level of iteration in the channel estimation and the side lobe selection processing step may be performed only in an nth level of iteration in the channel estimation, wherein n is a total number of levels of iteration.

According to another aspect, an embodiment of the present disclosure provides an anti-sampling offset processing method for channel estimation in a wireless communication system, and the method includes: a main path threshold determination module configured to acquire a main path threshold and a first side lobe threshold based on a result of Inverse Fast Fourier Transform (IFFT) during the channel estimation, wherein the first side lobe threshold is smaller than the main path threshold; a noise reduction threshold determination module configured to acquire a noise reduction threshold and a second side lobe threshold based on a measurement result of Interference on Signal Code Power (ISCP), wherein the second side lobe threshold is smaller than the noise reduction threshold; a side lobe determination processing module configured to select a predetermined number of strongest paths from main paths determined according to the main path threshold and the noise reduction threshold and to label a predetermined number of paths adjacent to the strongest paths as side lobes; and a side lobe selection processing module configured to select the paths labelled as side lobes according to a final threshold and to reserve paths equal to or larger than the final threshold for participation of subsequent demodulation, wherein the final threshold is a greater one of the first side lobe threshold and the second side lobe threshold.

Beneficial effects of the technical solutions provided by the embodiments of the present disclosure are as follows:

in the embodiments of the present disclosure, impacts of sampling offsets in a wireless communication system on channel estimation are taken into consideration, side lobes of a main path are introduced into a demodulation process, thereby improving significantly reception performance of a terminal in the wireless communication system in cases where there are sampling offsets, improving user experiences of the terminal under mobile and multi-path environments, and facilitating lowering the system's requirements on timing accuracy and thus reducing operation cost.

DETAILED DESCRIPTION

The present disclosure will be further elaborated below in combination with accompanying drawings and embodiments. It should be understood that the specific embodiments are only used to interpret the present disclosure instead of limiting the present disclosure.

Figure 1:
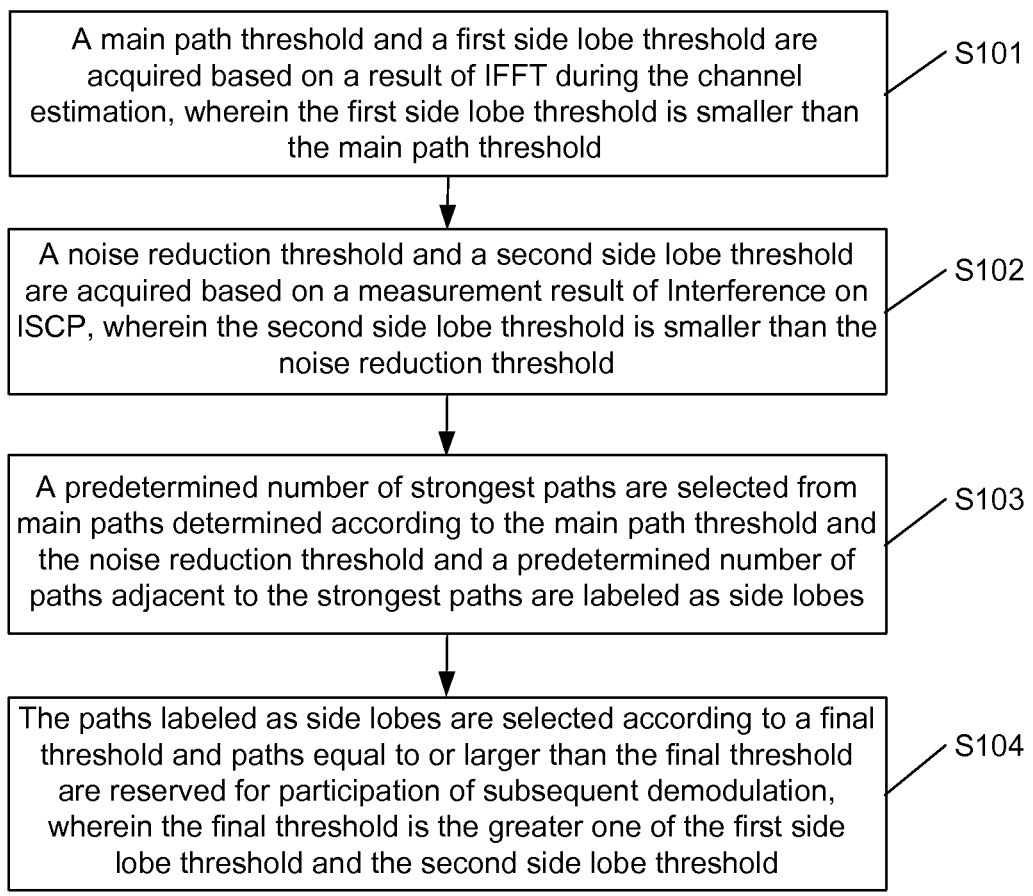
FIG. 1 is a flow chart of an anti-sampling offset processing method for channel estimation in a wireless communication system according to an embodiment of the present disclosure.

In the present disclosure, impacts of sampling offsets in a wireless communication system on channel estimation are taken into consideration, and in the channel estimation process, both selection of a main path and selection of side lobes are taken into consideration, thus an anti-sampling offset processing solution is formed; FIG. 1 is a flow chart of an anti-sampling offset processing method for channel estimation in a wireless communication system according to an embodiment of the present disclosure, and the flow chart includes the following steps:

S101, a main path threshold determination step of acquiring a main path threshold and a first side lobe threshold based on a result of Inverse Fast Fourier Transform (IFFT) during the channel estimation, wherein the first side lobe threshold is smaller than the main path threshold;

S102, a noise reduction threshold determination step of acquiring a noise reduction threshold and a second side lobe threshold based on a measurement result of Interference on Signal Code Power (ISCP), wherein the second side lobe threshold is smaller than the noise reduction threshold;

S103, a side lobe determination processing step of selecting a predetermined number of strongest paths from main paths determined according to the main path threshold and the noise reduction threshold and labeling a predetermined number of paths adjacent to the strongest paths as side lobes; and S104, a side lobe selection processing step of selecting the paths labelled as side lobes according to a final threshold and reserving paths equal to or larger than the final threshold for participation of subsequent demodulation, wherein the final threshold is the greater one of the first side lobe threshold and the second side lobe threshold.

The above processing scheme is applied to channel estimation in a wireless communication system, and in the main path threshold determination step S101 and the noise reduction threshold determination step S102, on one hand, the main path threshold and the noise reduction threshold are obtained for subsequent main path selection and noise reduction processing, on the other hand, two thresholds related to side lobes can be obtained, i.e., the first side lobe threshold and the second side lobe threshold, and the first side lobe threshold is smaller than the main path threshold and the second side lobe threshold is smaller than the noise reduction threshold, and both are a threshold for selecting side lobes;

in the side lobe determination processing step S103, two (maybe one or three) maximum paths are selected from determined main paths as strongest paths, and a certain number of paths are determined from paths adjacent to the strongest paths as side lobes of the strongest paths, then the side lobes may be reserved in subsequent processes for participation of demodulation; such processing is reasonable, because when strongest paths are taken as main paths and energy of side lobes adjacent to them attenuates, then the side lobes are likely to be eliminated during a noise reduction process, thus resulting in sampling offset; but in the present solution, paths adjacent to the strongest paths are taken as side lobes and special processing is performed thereon so that the purpose of anti-sampling offsets can be achieved;

in the side lobe selection processing step S104, a larger one of the first side lobe threshold from S101 and the second side lobe threshold from S102 is selected as a final threshold based on which side lobes in S103 that should be reserved are selected. Specifically, side lobes equal to or larger than the final threshold are reserved for direct participation in subsequent demodulation so as to achieve anti-sampling offsets; and the special processing is not performed on side lobes smaller than the final threshold and such side lobes together with the main path previously determined are processed traditionally using the main path threshold.

Figure 2:
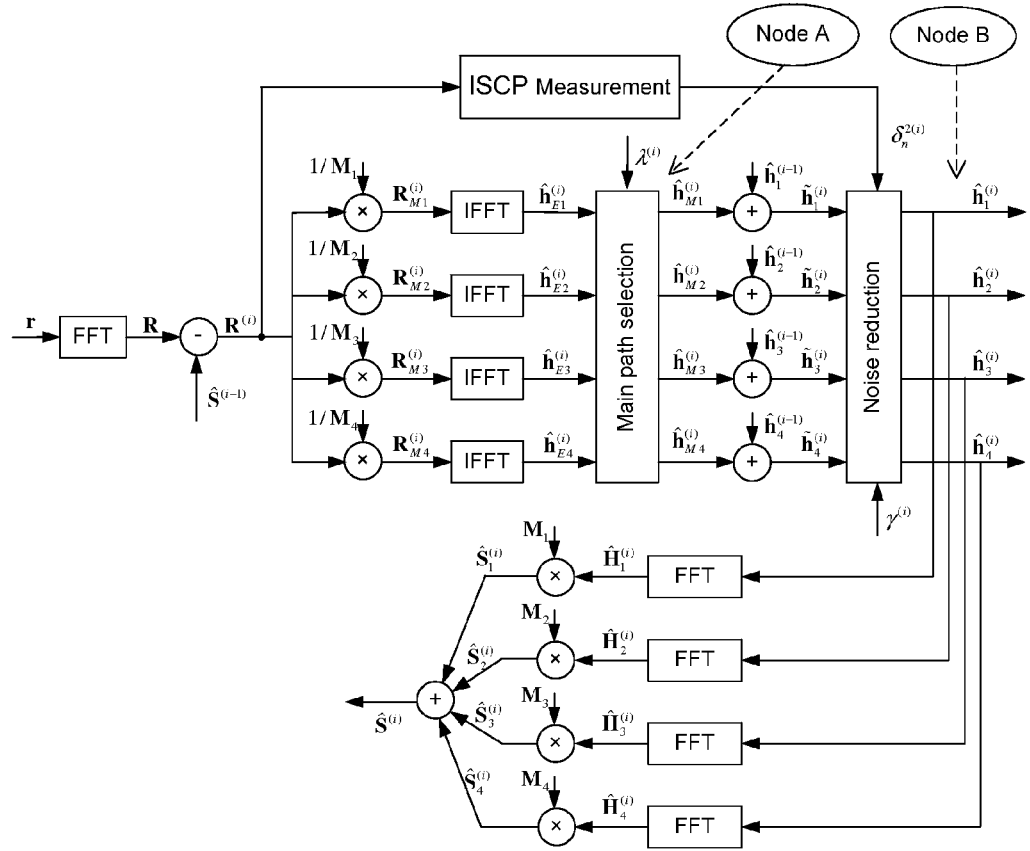
FIG. 2 is an architecture of channel estimation using an anti-sampling offset processing method according to an embodiment of the present disclosure.

FIG. 2 is an architecture of channel estimation using an anti-sampling offset processing method according the present disclosure, form which application of the present disclosure can be known intuitively and thoroughly.

Specifically, step 1, data corresponding to a midamble code portion of a received signal is separated and represented as r;

step 2, FFT is performed on r to obtain R;

step 3, full interference cancellation is performed on R which is represented as $R^{(i)}=R-\hat{S}^{(i-1)}$ in an ith level of iteration, wherein $\hat{S}^{(i)}$ is an interference reconstruction value with its initial value being 0;

step 4, $R^{(i)}$ is delivered to an ISCP measurement module to acquire a noise measurement value $\delta^{2(i)}$ of an ith level iteration, and the initial value of the noise measurement is 0;

step 5, $R^{(i)}$ acquired in step 3 is dot-multiplied by $1/M_j$, wherein $M_j$ is an FFT result of a basic midamble code of a jth cell;

step 6, IFFT is performed on an result acquired in step 5 to obtain residual channel estimation of respective cells. The embodiment in FIG. 2 has four cells, then $\hat{h}_{E1}^{(i)}$, $\hat{h}_{E2}^{(i)}$, $\hat{h}_{E3}^{(i)}$ and $\hat{h}_{E4}^{(i)}$ are obtained;

step 7, main path selection is performed on all of the cells acquired in step 6 to acquire the channel estimation $\hat{h}_{Mj}^{(i)}$;

here, traditional processing is using a main path threshold factor to calculate a main path threshold for the main path selection, while in the present disclosure, a main path threshold is calculated together with a side lobe threshold, and the side lobe threshold is smaller than the main path threshold. The embodiment adopts a method of calculating the side lobe threshold by way of adding a "side lobe threshold factor", specifically, a main path threshold factor is followed immediately by a side lobe threshold factor, which is represented by:

$$\Gamma_j^{(i)} = \lambda_{j+1}^{(i)} \max\left(\left[|\hat{h}_{E1}^{(i)}|^2 \; |\hat{h}_{E2}^{(i)}|^2 \; \ldots \; |\hat{h}_{Ej}^{(i)}|^2\right]\right)$$

wherein $\hat{h}_{Ej}^{(i)}$ is a result of IFFT during an ith level channel estimation of a jth cell, $\lambda_j^{(i)}$ is a threshold factor, wherein $\lambda_1^{(i)} \sim \lambda_j^{(i)}$ is a main path threshold factor and a corresponding $\Gamma^{(i)}$ is the main path threshold, and $\lambda_{j+1}^{(i)}$ is a side lobe threshold factor of the main path and a corresponding $\Gamma^{(i)}$ is a side lobe threshold; and the value of the side lobe threshold factor is smaller than the value of the main path threshold factor, and the obtained side lobe threshold is smaller than the main path threshold;

for example, in another embodiment of the present disclosure, for anti-sampling offset channel estimation in a TD-SCDMA system, when there are four cells, initial values of threshold factors $\lambda_j^{(i)}$ are set to [614, 716, 819, 921, 102], wherein $\lambda$=102 is namely the value of the side lobe threshold factor and the corresponding $\Gamma$ is namely the side lobe threshold reserved for use in subsequent steps. The rest is the main path threshold that is processed according to a traditional algorithm.

in step 7, the main path selection process is actually a process for reserving all paths having a power equal to or larger than the main path threshold and setting others to 0, and the obtained result is labelled as $\hat{h}_{Mj}^{(i)}$. Here, since the newly added side lobe threshold is smaller than the main path threshold, there is no impact on the main path selection;

step 8, the acquired result is added to $\hat{h}_j^{(i-1)}$ to acquire $\tilde{h}_j^{(i)}$.

step 9, noise reduction is performed on $\tilde{h}_j^{(i)}$ using the noise power $\delta^{2(i)}$ measured in step 4 and the noise reduction threshold $\Omega$ to acquired noise-reduced $\hat{h}_j^{(i)}$, wherein the calculation process of the noise reduction threshold $\Omega$ is specially processed;

previously, a noise reduction threshold is calculated using a noise reduction factor, while in the present disclosure, the noise reduction threshold is obtained together with a side lobe threshold, and the side lobe threshold is smaller than the noise reduction threshold. Similar to the process for calculating a side lobe threshold of a main path in step 7, the embodiment adopts a method of adding another "side lobe threshold factor" to calculate the side lobe threshold during noise reduction, specifically, a noise reduction threshold factor is followed immediately by a noise reduction side lobe threshold factor, which is represented by:

$$\Omega_j^{(i)} = \lambda_{j+1}^{(i)} \delta^{2(i)}$$

wherein $\delta^{2(i)}$ is a noise measurement result of the ISCP during an ith level channel estimation, $\lambda_j^{(i)}$ is a threshold factor, wherein $\lambda_1^{(i)} \sim \lambda_j^{(i)}$ is a noise reduction threshold factor and a corresponding $\Omega^{(i)}$ is the noise reduction threshold, and $\lambda_{j+1}^{(i)}$ is a side lobe threshold factor of noise reduction and a corresponding $\Omega^{(i)}$ is a noise reduction side lobe threshold; and the value of the noise reduction side lobe threshold factor is smaller than the value of the noise reduction threshold factor;

in the embodiment, initial values of $\lambda_j^{(i)}$ are set to [640, 640, 640, 640, 128], wherein $\lambda$=128 is namely the value of the noise reduction side lobe threshold factor and the corresponding $\Gamma$ is namely the noise reduction side lobe threshold reserved for use in subsequent steps. The rest is an ordinary noise reduction threshold that is processed according to a traditional algorithm;

in step 9, the noise reduction processing is actually a process for reserving paths of $\tilde{h}_j^{(i)}$ having a power equal to or larger than the noise reduction threshold $\Omega$ and setting others to 0, and the obtained result $\hat{h}_j^{(i)}$. Here the newly-added noise reduction side lobe threshold is smaller than the noise reduction threshold, thus having no impact on the noise reduction processing;

step 10, FFT is performed on $\hat{h}_j^{(i)}$ to obtain $\hat{H}_j^{(i)}$;

step 11, $\hat{H}_j^{(i)}$ is dot-multiplied by M to obtain a signal recovery $\hat{S}_j^{(i)}$ of a ith iteration; and step 12, $\hat{S}_j^{(i)}$ of respective cells are added to acquire $\hat{S}_j^{(i)}$, i.e., an interference reconstruction signal for use in a next iteration in step 3.

It should be noted that the above steps 10 to 12 are to make preparation for a next level of iteration, and if a preset level of iteration is finished, $\hat{h}_j^{(i)}$ is output and steps 10 to 12 are no longer performed.

As a special processing of the anti-sampling offset of the present disclosure, after a side lobe threshold of and a noise reduction side lobe threshold of a main path are obtained in a previous level of iteration, in a current level of iteration, when step 9 is reached, i.e., at node B in FIG. 2, a "side lobe determination" processing process as below is required to be performed.

In main paths after the noise reduction processing, 0 to 3 strongest paths are selected as reference objects; selection of two strongest paths is taken as an example (when 0 is taken, it indicates a case where no side lobe processing is performed, i.e., there are no sampling offsets), paths adjacent to the two strongest paths are determined as side lobes of respective strongest paths, and preferred side lobes are a same number of paths equally located on both sides of a strongest path, for example 3 chips on both sides are labelled as side lobes, and any number of side lobes of 0 to 5 chips can be selected; when 0 is taken, it corresponds to a case where there is no sampling offsets. Further, in practical conditions, a valid index range of side lobes can be defined as within 15 chips respectively on the left and the right of a strongest path, and paths beyond this range will not be taken into consideration during the side lobe determination.

The purpose of the above processing is to determine part of valid paths as side lobes, a selected strongest path per se will be involved in next level of main path selection whether or not the above side lobe determination process exists, and the strongest path per se will not be regarded as a side lobe.

In the next level of iteration, when proceed to step 7 (the main path selection step), i.e., at node A in FIG. 2, paths determined as side lobes at node B in the previous level of iteration are all reserved, and proceed to a next step; other paths are processed based on a main path threshold through a processing method as same as the traditional method, and then proceed to a next step after the processing.

When node B is reached once more, a "side lobe selection" processing process as follows is performed.

Paths determined as side lobes are processed based on a final threshold; those passing the side lobe processing are reserved and then subjected to subsequent processing, while those not passing the side lobe processing are set to 0. Specifically, the final threshold refers to a greater one of a main path side lobe threshold and a noise reduction side lobe threshold obtained in a previous level of iteration; the side lobe processing is a process for comparing paths determined as side lobes with the final threshold, those equal to or larger than the final threshold pass the side lobe processing, and those smaller than the final threshold are set to 0.

Other paths are processed based on a noise reduction threshold through a processing method as same as the traditional method.

Then, the embodiment implements anti-sampling offset processing in channel estimation in a wireless communication system.

In a preferred embodiment of the present disclosure, the "side lobe determination" processing is not required to be performed in each level of iteration, it is only performed at the second last level of iteration, and accordingly the "side lode selection" processing is only performed at the last level of iteration, the two processings do not function at other levels of iteration. The reason why such an arrangement is implemented is that in practice, when the cost balance between requirements on system accuracy and hardware and time is taken into consideration, after a previous level of iteration and accumulation are finished, performing one side lobe determination processing and one side lobe selection processing are enough, then they are output for participation of demodulation so as to achieve the purpose of improving performance of a receiver.

Figure 3:
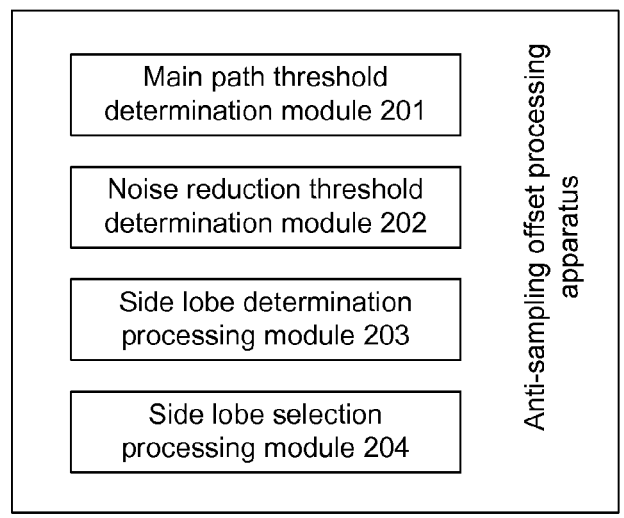
FIG. 3 is a structural diagram of an anti-sampling offset processing method for channel estimation in a wireless communication system according to an embodiment of the present disclosure.

In order to solve the problem in the prior art that sampling offsets are not taken into consideration in channel estimation, the present disclosure accordingly provides an anti-sampling offset processing method for channel estimation in a wireless communication system, as shown in the structural diagram in FIG. 3, the method includes:

a main path threshold determination module 201 configured to acquire a main path threshold and a first side lobe threshold based on a result of Inverse Fast Fourier Transform (IFFT) during the channel estimation, wherein the first side lobe threshold is smaller than the main path threshold;

a noise reduction threshold determination module 202 configured to acquire a noise reduction threshold and a second side lobe threshold based on a measurement result of Interference on Signal Code Power (ISCP), wherein the second side lobe threshold is smaller than the noise reduction threshold;

a side lobe determination processing module 203 configured to select a predetermined number of strongest paths from main paths determined according to the main path threshold and the noise reduction threshold and to label a predetermined number of paths adjacent to the strongest paths as side lobes; and a side lobe selection processing module 204 configured to select the paths labelled as side lobes according to a final threshold and to reserve paths equal to or larger than the final threshold for participation of subsequent demodulation, wherein the final threshold is the greater one of the first side lobe threshold and the second side lobe threshold.

In the embodiment of the present disclosure, the main path threshold determination module 201 determines the main path threshold and the first side lobe threshold based on the following formula:

$$\Gamma_j^{(i)} = \lambda_{j+1}^{(i)} \max\left(\left[|\hat{h}_{E1}^{(i)}|^2 |\hat{h}_{E2}^{(i)}|^2 \ldots |\hat{h}_{Ej}^{(i)}|^2\right]\right)$$

wherein $\hat{h}_{Ej}^{(i)}$ is a result of IFFT during an ith level channel estimation of a jth cell, $\lambda_j^{(i)}$ is a threshold factor, wherein $\lambda_1^{(i)} \sim \lambda_j^{(i)}$ is a main path threshold factor and a corresponding $\Gamma^{(i)}$ is the main path threshold, and $\lambda_{j+1}^{(i)}$ is a first side lobe threshold factor and a corresponding $\Gamma^{(i)}$ is the first side lobe threshold; and the value of the first side lobe threshold factor is smaller than the value of the main path threshold factor.

In the embodiment of the present disclosure, the noise reduction threshold determination module 202 determines the noise reduction threshold and the second side lobe threshold based on the following formula:

$$\Omega_j^{(i)} = \lambda_{j+1}^{(i)} \delta^{2(i)}$$

wherein $\delta^{2(1)}$ is a noise measurement of the ISCP during an ith level channel estimation, $\lambda_j^{(i)}$ is a threshold factor, wherein $\lambda_1^{(i)} \sim \lambda_j^{(i)}$ is a noise reduction threshold factor and a corresponding $\Omega^{(i)}$ is the noise reduction threshold, and $\lambda_{j+1}^{(i)}$ is a second side lobe threshold factor and a corresponding $\Omega^{(i)}$ is the second side lobe threshold; and the value of the second side lobe threshold factor is smaller than the value of the noise reduction threshold factor.

In an embodiment of the present disclosure, the predetermined number of paths may include a same number of paths equally located on the left and the right of the strongest paths, and the same number may be any one of 0 to 5 chips.

In an embodiment of the present disclosure, the predetermined number of the strongest paths may be any integer of 0 to 3, and the strongest paths are not labelled as side lobes.

In an embodiment of the present disclosure, the side lobe determination processing module 203 functions only in a penultimate level of iteration in the channel estimation and the side lobe selection processing module 204 functions only in the last level of iteration in the channel estimation.

In practical applications, the anti-sampling offset processing apparatus can be located in an equipment of a wireless communication system; the aforementioned main path threshold determination module 201, the noise reduction threshold determination module 202, the side lobe determination processing module 203 and the side lobe selection processing module 204 can all be implemented by a Central Processing Unit (CPU), a Digital Signal Processor (DSP) or a Field Programmable Gate Array (FPGA) of the equipment of the wireless communication system.

Figure 4:
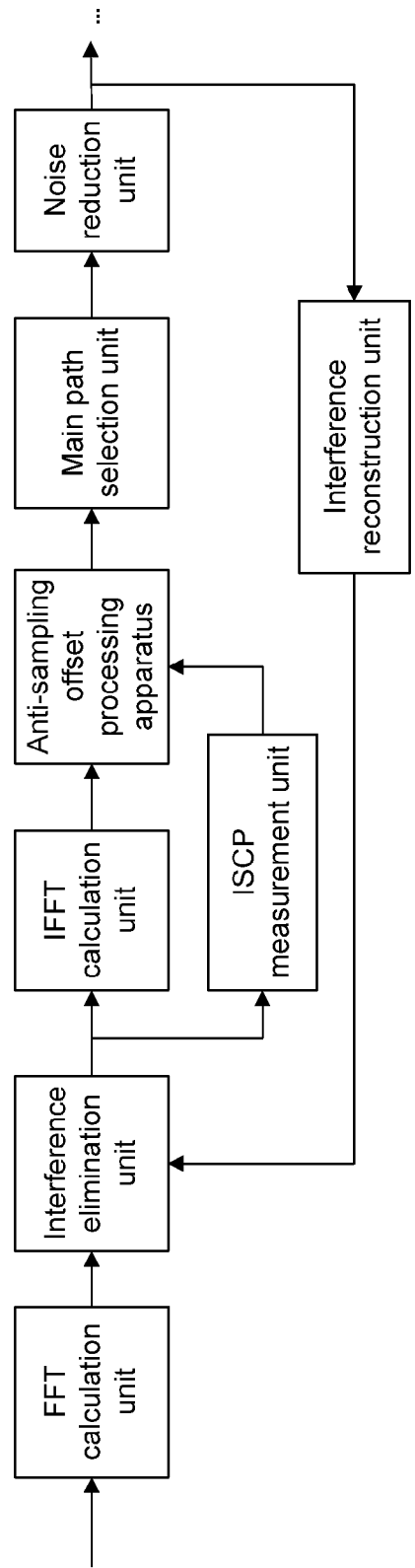
FIG. 4 is a structural diagram of an anti-sampling offset processing apparatus for channel estimation according to an embodiment of the present disclosure.

FIG. 4 shows a structural diagram of a channel estimation apparatus using the anti-sampling offset processing apparatus according to the present disclosure, wherein an FFT calculation unit is configured to perform FFT on data, an interference elimination unit is configured to perform interference cancellation processing on an output result of the FFT calculation unit, an ISCP measurement unit is configured to perform ISCP calculation on output from the interference cancellation unit; the anti-sampling offset processing apparatus may be configured to determine a main path threshold, a main path side lobe threshold, a noise reduction threshold and a noise reduction side lobe threshold, and it may be further configured to determine paths to be processed as side lobes, and to reserve, according to a final threshold, a part of side lobes to be output together with paths processed by a main path selection unit and a noise reduction unit, for participation in subsequent demodulation, thereby achieving the purpose of increasing performance of the receiver. In addition, an interference reconstruction unit may be configured to determine an interference reconstruction signal and to output the interference reconstruction signal to the interference elimination unit for interference cancellation processing.

Although preferred embodiments of the present disclosure are disclosed for purpose of illustration, it should be realized by those skilled in the art that various modifications, additions and substitutions are possible, thus the scope of protection of the present disclosure should not be limited to the above embodiments. Therefore, all modifications, replacements and improvements made according to the principle of the present disclosure should be included within the scope of protection of the present disclosure.

INDUSTRIAL APPLICABILITY

In the embodiments of the present disclosure, a main path threshold and a first side lobe threshold are acquired based on a result of IFFT during the channel estimation, wherein the first side lobe threshold is smaller than the main path threshold; a noise reduction threshold and a second side lobe threshold are acquired based on a measurement result of Interference on Signal Code Power (ISCP), wherein the second side lobe threshold is smaller than the noise reduction threshold; a predetermined number of strongest paths are selected from main paths determined according to the main path threshold and the noise reduction threshold and a predetermined number of paths adjacent to the strongest paths are labelled as side lobes; and the paths labelled as side lobes are selected according to a final threshold and paths equal to or larger than the final threshold are reserved for participation of subsequent demodulation. In this way, signal side lobes are introduced into a demodulation process, thus reception performance of a terminal in the wireless communication system can be improved.

The invention claimed is:

1. An anti-sampling offset processing method for channel estimation in a wireless communication system, the method comprising:
a main path threshold determination step of acquiring a main path threshold and a first side lobe threshold based on a result of Inverse Fast Fourier Transform (IFFT) during the channel estimation, wherein the first side lobe threshold is smaller than the main path threshold;
a noise reduction threshold determination step of acquiring a noise reduction threshold and a second side lobe threshold based on a measurement result of Interference on Signal Code Power (ISCP), wherein the second side lobe threshold is smaller than the noise reduction threshold;
a side lobe determination processing step of selecting a predetermined number of strongest paths from main paths determined according to the main path threshold and the noise reduction threshold and labeling a predetermined number of paths adjacent to the strongest paths as side lobes; and
a side lobe selection processing step of selecting the paths labeled as side lobes according to a final threshold and reserving paths equal to or larger than the final threshold for participation of subsequent demodulation, wherein the final threshold is a greater one of the first side lobe threshold and the second side lobe threshold;
wherein in the main path threshold determination step, the main path threshold and the first side lobe threshold are determined based on a following formula:

$$\Gamma_j^{(i)} = \lambda_{j+1}^{(i)} \max\left( \left[ |\hat{h}_{E1}^{(i)}|^2 \ |\hat{h}_{E2}^{(i)}|^2 \ \ldots \ |\hat{h}_{Ej}^{(i)}|^2 \right] \right)$$

wherein $\hat{h}_{Ej}^{(i)}$, is a result of IFFT during an ith level channel estimation of a jth cell, $\lambda_j^{(i)}$ is a threshold factor, wherein $\lambda_1^{(i)} \sim \lambda_j^{(i)}$ is a main path threshold factor and a corresponding $\Gamma^{(i)}$ is the main path threshold, and $\lambda_{j+1}^{(i)}$ is a first side lobe threshold factor and a corresponding $\Gamma^{(i)}$ is the first side lobe threshold;
wherein a value of the first side lobe threshold factor is smaller than a value of the main path threshold factor.

2. The method according to claim 1, wherein in the noise reduction threshold determination step, the noise reduction threshold and the second side lobe threshold are determined based on a following formula:

$$\Omega_j^{(i)} = \gamma_{j+1}^{(i)} \delta^{2(i)}$$

wherein $\delta^{2(i)}$ is a noise measurement result of the ISCP during an ith level channel estimation, $\gamma_j^{(i)}$ is a threshold factor, wherein $\lambda_1^{(i)} \sim \lambda_j^{(i)}$ is a noise reduction threshold factor and a corresponding $\Omega^{(i)}$ is the noise reduction threshold, and $\gamma_{j+1}^{(i)}$ is a second side lobe threshold factor and a corresponding $\Omega^{(i)}$ is the second side lobe threshold;
wherein a value of the second side lobe threshold factor is smaller than a value of the noise reduction threshold factor.

3. The method according to claim 1, wherein in the side lobe determination processing step, the predetermined number of paths comprise a same number of paths equally located on the left and the right of the strongest paths, and the same number is any one of 0 to 5 chips.

4. The method according to claim 1, wherein in the side lobe determination processing step, the predetermined number of the strongest paths is any integer of 0 to 3, and the strongest paths are not labeled as side lobes.

5. The method according to claim 1, wherein the side lobe determination processing step is performed only in a (n−1)th level of iteration in the channel estimation and the side lobe selection processing step is performed only in an nth level of iteration in the channel estimation, wherein n is a total number of levels of iteration.

6. An anti-sampling offset processing apparatus for channel estimation in a wireless communication system, the apparatus comprising:
a main path threshold determination module configured to acquire a main path threshold and a first side lobe threshold based on a result of Inverse Fast Fourier Transform (IFFT) during the channel estimation, wherein the first side lobe threshold is smaller than the main path threshold;
a noise reduction threshold determination module configured to acquire a noise reduction threshold and a second side lobe threshold based on a measurement result of Interference on Signal Code Power (ISCP), wherein the second side lobe threshold is smaller than the noise reduction threshold;
a side lobe determination processing module configured to select a predetermined number of strongest paths from main paths determined according to the main path threshold and the noise reduction threshold and to label a predetermined number of paths adjacent to the strongest paths as side lobes; and
a side lobe selection processing module configured to select the paths labelled as side lobes according to a final threshold and to reserve paths equal to or larger than the final threshold for participation of subsequent demodulation, wherein the final threshold is a greater one of the first side lobe threshold and the second side lobe threshold;

wherein the main path threshold determination module, the noise reduction threshold determination module, the side lobe determination processing module and the side lobe selection processing module are implemented by a Central Processing Unit (CPU), a Digital Signal Processor (DSP) or a Field Programmable Gate Array (FPGA);

wherein the main path threshold determination module determines the main path threshold and the first side lobe threshold based on a following formula:

$$\Gamma_j^{(i)} = \lambda_{j+1}^{(i)} \max\left(\left[|\hat{h}_{E1}^{(i)}|^2 |\hat{h}_{E2}^{(i)}|^2 \ldots |\hat{h}_{Ej}^{(i)}|^2\right]\right)$$

wherein $\hat{h}_{Ej}^{(i)}$ is a result of IFFT during an ith level channel estimation of a jth cell, $\lambda_j^{(i)}$ is a threshold factor, wherein $\lambda_1^{(i)} \sim \lambda_j^{(i)}$ is a main path threshold factor and a corresponding $\Gamma^{(i)}$ is the main path threshold, and $\lambda_{j+1}^{(i)}$ is a first side lobe threshold factor and a corresponding $\Gamma^{(i)}$ is the first side lobe threshold;

wherein a value of the first side lobe threshold factor is smaller than a value of the main path threshold factor.

7. The anti-sampling offset processing apparatus according to claim 6, wherein the noise reduction threshold determination module determines the noise reduction threshold and the second side lobe threshold based on a following formula:

$$\Omega_j^{(i)} = \gamma_{j+1}^{(i)} \delta^{2(i)}$$

wherein $\delta^{2(i)}$ is a noise measurement result of the ISCP during an ith level channel estimation, $\gamma_j^{(i)}$ is a threshold factor, wherein $\lambda_1^{(i)} \sim \lambda_j^{(i)}$ is a noise reduction threshold factor and a corresponding $\Omega(i)$ is the noise reduction threshold, and $\gamma_{j+1}^{(i)}$ is a second side lobe threshold factor and a corresponding $\Omega^{(i)}$ is the second side lobe threshold;

wherein a value of the second side lobe threshold factor is smaller than a value of the noise reduction threshold factor.

8. The anti-sampling offset processing apparatus according to claim 6, wherein the predetermined number of paths comprise a same number of paths equally located on the left and the right of the strongest paths, and the same number is any one of 0 to 5 chips.

9. The anti-sampling offset processing apparatus according to claim 6, wherein the predetermined number of the strongest paths is any integer of 0 to 3, and the strongest paths are not labeled as side lobes.

10. The anti-sampling offset processing apparatus according to claim 6, wherein the side lobe determination processing module functions only in a (n−1)th level of iteration in the channel estimation and the side lobe selection processing module functions only in an nth level of iteration in the channel estimation, wherein n is a total number of levels of iteration.

* * * * *